(12) United States Patent
Nakamura et al.

(10) Patent No.: US 9,559,509 B2
(45) Date of Patent: Jan. 31, 2017

(54) POWER SUPPLY CONTROL DEVICE

(71) Applicants: KEIHIN CORPORATION, Tokyo (JP); HONDA MOTOR CO., LTD., Tokyo (JP)

(72) Inventors: Takeshi Nakamura, Utsunomiya (JP); Daiki Kudo, Utsunomiya (JP); Masashi Ueda, Sendai (JP); Kosuke Tachikawa, Torrance, CA (US); Tetsuya Hasebe, Utsunomiya (JP)

(73) Assignees: KEIHIN CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 14/350,453

(22) PCT Filed: Oct. 4, 2012

(86) PCT No.: PCT/JP2012/075771
§ 371 (c)(1),
(2) Date: Apr. 8, 2014

(87) PCT Pub. No.: WO2013/054727
PCT Pub. Date: Apr. 18, 2013

(65) Prior Publication Data
US 2014/0299373 A1    Oct. 9, 2014

(30) Foreign Application Priority Data

Oct. 13, 2011   (JP) .................................. 2011-225912

(51) Int. Cl.
*H02G 5/06*     (2006.01)
*H01M 10/42*    (2006.01)
(Continued)

(52) U.S. Cl.
CPC ............. *H02G 5/06* (2013.01); *H01M 10/425* (2013.01); *H01M 2/206* (2013.01); *H01M 10/482* (2013.01); *H01M 2220/20* (2013.01)

(58) Field of Classification Search
None
See application file for complete search history.

(56) References Cited

U.S. PATENT DOCUMENTS 4,039,900 A * 8/1977 Roback ................. H05K 7/209
                                                                  323/280
5,346,011 A * 9/1994 Onan ..................... C09K 8/424
                                                                  166/153
(Continued)

FOREIGN PATENT DOCUMENTS

JP      2008-97942 A     4/2008
JP      2009-289428 A    12/2009
(Continued)

OTHER PUBLICATIONS

International Search Report for International Application No. PCT/JP2012/075771; Date of mailing: Dec. 25, 2012 with English Translation.

*Primary Examiner* — Jeremy C Norris
*Assistant Examiner* — Muhammed Azam
(74) *Attorney, Agent, or Firm* — Cantor Colburn LLP

(57) ABSTRACT

A power supply control device includes: a control board that is configured to control a voltage of a battery module; and a bus bar module that is configured to electrically connect the control board and the battery module, the control board and the bus bar module are arranged in a stacked manner, and connection terminals of the bus bar module which are connected to the battery module are exposed when viewed from the control board.

3 Claims, 4 Drawing Sheets

(51) Int. Cl.
*H01M 2/20* (2006.01)
*H01M 10/48* (2006.01)

(56) References Cited

U.S. PATENT DOCUMENTS

| | | | | |
|---|---|---|---|---|
| 5,643,693 A * | 7/1997 | Hill | ............... | H01M 2/348 |
| | | | | 429/121 |
| 5,645,448 A * | 7/1997 | Hill | ............... | H01H 85/205 |
| | | | | 439/522 |
| D427,968 S * | 7/2000 | Nagahara | ............... | D13/110 |
| D428,388 S * | 7/2000 | Nagahara | ............... | D13/110 |
| D428,851 S * | 8/2000 | Nagahara | ............... | D13/110 |
| D429,214 S * | 8/2000 | Nagahara | ............... | D13/110 |
| D429,215 S * | 8/2000 | Sugimoria | ............... | D13/110 |
| D432,080 S * | 10/2000 | Sugimoria | ............... | D13/110 |
| D442,913 S * | 5/2001 | Nagahara | ............... | D13/110 |
| D442,914 S * | 5/2001 | Nagahara | ............... | D13/110 |
| 6,549,428 B1 * | 4/2003 | Fontana | ............... | H02B 1/20 |
| | | | | 174/71 B |
| 7,500,888 B2 * | 3/2009 | Roset | ............... | H01R 11/281 |
| | | | | 439/754 |
| 8,305,034 B2 * | 11/2012 | Rubio | ............... | G01R 1/203 |
| | | | | 320/104 |
| 8,426,056 B2 * | 4/2013 | Ikeda | ............... | H01M 2/206 |
| | | | | 429/156 |
| 8,709,627 B2 * | 4/2014 | Matsushima | ............... | G01R 31/3696 |
| | | | | 324/156 |
| 2002/0102457 A1 * | 8/2002 | Oogami | ............... | B60L 3/0046 |
| | | | | 429/159 |
| 2002/0180405 A1 * | 12/2002 | Batson | ............... | H02J 7/0047 |
| | | | | 320/128 |
| 2008/0050645 A1 * | 2/2008 | Kai | ............... | B60L 11/1861 |
| | | | | 429/61 |
| 2009/0197161 A1 * | 8/2009 | Nakamura | ............... | H01M 2/206 |
| | | | | 429/158 |
| 2009/0301700 A1 * | 12/2009 | German | ............... | B21D 53/04 |
| | | | | 165/160 |
| 2010/0047676 A1 * | 2/2010 | Park | ............... | H01M 2/105 |
| | | | | 429/93 |
| 2010/0116570 A1 * | 5/2010 | Sugawara | ............... | B60K 1/04 |
| | | | | 180/65.1 |
| 2010/0124693 A1 * | 5/2010 | Kosugi | ............... | G01R 31/3644 |
| | | | | 429/92 |
| 2010/0185405 A1 * | 7/2010 | Aoshima | ............... | B60L 3/0046 |
| | | | | 702/63 |
| 2010/0196749 A1 * | 8/2010 | Yoshida | ............... | H01M 2/0242 |
| | | | | 429/99 |
| 2010/0255355 A1 * | 10/2010 | Park | ............... | H01M 2/105 |
| | | | | 429/91 |
| 2010/0309949 A1 * | 12/2010 | Akaboshi | ............... | H01M 2/1077 |
| | | | | 374/45 |
| 2011/0008669 A1 * | 1/2011 | Ogasawara | ............... | H01M 2/1072 |
| | | | | 429/160 |
| 2011/0193528 A1 * | 8/2011 | Huggins | ............... | H01M 10/482 |
| | | | | 320/134 |
| 2011/0195284 A1 * | 8/2011 | Yasui | ............... | H01M 2/0242 |
| | | | | 429/82 |
| 2011/0241602 A1 * | 10/2011 | Chou | ............... | H02J 7/35 |
| | | | | 320/101 |
| 2012/0003505 A1 * | 1/2012 | Kim | ............... | H01M 2/1077 |
| | | | | 429/7 |
| 2012/0064379 A1 * | 3/2012 | Oguri | ............... | H01M 2/1016 |
| | | | | 429/56 |
| 2012/0100401 A1 * | 4/2012 | Yasui | ............... | H01M 2/105 |
| | | | | 429/7 |
| 2012/0121942 A1 * | 5/2012 | Kim | ............... | H01M 2/0426 |
| | | | | 429/7 |
| 2012/0148890 A1 * | 6/2012 | Goto | ............... | H01M 2/1077 |
| | | | | 429/90 |
| 2012/0164508 A1 * | 6/2012 | Houchin-Miller | ............... | B60K 6/442 |
| | | | | 429/120 |
| 2012/0308849 A1 * | 12/2012 | Tortstensson | ............... | H01M 2/1072 |
| | | | | 429/7 |
| 2012/0328908 A1 * | 12/2012 | Han | ............... | H01M 2/1061 |
| | | | | 429/7 |
| 2012/0328919 A1 * | 12/2012 | Laderer | ............... | H01M 10/482 |
| | | | | 429/90 |
| 2013/0034758 A1 * | 2/2013 | Raedsch | ............... | H01M 2/1077 |
| | | | | 429/90 |
| 2013/0082661 A1 * | 4/2013 | Bohan, Jr. | ............... | H01M 10/4221 |
| | | | | 320/134 |
| 2013/0100563 A1 * | 4/2013 | Cho | ............... | B60L 3/0046 |
| | | | | 361/63 |
| 2013/0146373 A1 * | 6/2013 | Kosaki | ............... | B60K 1/04 |
| | | | | 180/65.1 |
| 2014/0254122 A1 * | 9/2014 | Nakamura | ............... | H01M 10/48 |
| | | | | 361/775 |
| 2014/0295225 A1 * | 10/2014 | Okamoto | ............... | H01M 2/206 |
| | | | | 429/65 |
| 2014/0339891 A1 * | 11/2014 | Ohkawa | ............... | H01M 10/44 |
| | | | | 307/9.1 |
| 2015/0042284 A1 * | 2/2015 | Murata | ............... | B60L 11/1866 |
| | | | | 320/126 |

FOREIGN PATENT DOCUMENTS

| | | |
|---|---|---|
| JP | 2010-3466 A | 1/2010 |
| JP | 2010-56035 A | 3/2010 |
| JP | 2011-54353 A | 3/2011 |
| JP | 2011-86634 A | 4/2011 |
| JP | 2012-174507 A | 9/2012 |

* cited by examiner

POWER SUPPLY CONTROL DEVICE

This is the U.S. national stage of application No. PCT/JP2012/075771, filed on 4 Oct. 2012. Priority under 35 U.S.C. §119(a) and 35 U.S.C. §365(b) is claimed from Japanese Application No. 2011-225912, filed 13 Oct. 2011, the disclosure of which is also incorporated herein by reference.

TECHNICAL FIELD OF THE INVENTION

The present invention relates to a power supply control device.

Priority is claimed on Japanese Patent Application No. 2011-225912, filed Oct. 13, 2011, the content of which is incorporated herein by reference.

BACKGROUND ART

A battery system mounted on a hybrid vehicle or an electric vehicle includes a control board that detects a voltage of a battery so as to prevent degradation of the battery due to overcharge or the like. For example, as described in Patent Document 1, the control board is installed on a battery module including multiple batteries and is electrically connected to the several batteries.

PRIOR ART DOCUMENTS

Patent Documents

Patent Document 1: Japanese Unexamined Patent Application, First Publication No. 2010-56035

SUMMARY OF THE INVENTION

Problems to be Solved by the Invention

On the other hand, a bus bar module may be disposed between the battery module and the control board, because of a difference in arrangement position or shape between connection terminals of the battery module and connection terminals of the control board.

The bus bar module includes bus bars and a resin member supporting the bus bars and connects the connection terminals of the battery module and the connection terminals of the control board to each other.

The bus bar module and the control board serve as a power supply control device in cooperation with each other. That is, the above-mentioned battery system has a configuration in which the power supply control device is installed on the battery module.

When the battery system in which the power supply control device is installed on the battery module is assembled, first, the bus bar module is installed on the battery module. At this time, for example, by screwing the connection terminals of the battery module and the connection terminals of the bus bar module to each other, the battery module and the bus bar module are fixed.

Subsequently, the control board is installed on the bus bar module. At this time, the bus bar module and the control board are electrically connected, for example, by soldering lead pins of the bus bar module to the connection terminals of the control board.

In this assembling process, workability in installing the control board on the bus bar module is poor, because the battery module is already fixed to the bus bar module. Particularly, when the lead pins of the bus bar module are soldered to the connection terminals of the control board, it is necessary to manage soldering so that heat generated at that time does not influence the battery module and thus the workability degrades.

The present invention is made in consideration of the above-mentioned problem and an object thereof is to improve workability at the time of installing a power supply control device on a battery module.

Means for Solving the Problems

The present invention employs the following configurations as measures for achieving the above-mentioned object.

(1) According to an aspect of the present invention, there is provided a power supply control device including: a control board that is configured to control a voltage of a battery module; and a bus bar module that is configured to electrically connect the control board and the battery module, wherein the control board and the bus bar module are arranged in a stacked manner, and connection terminals of the bus bar module which are connected to the battery module are exposed when viewed from the control board.

(2) In the power supply control device according to (1), the bus bar module may include bus bars, which have the connection terminals, and a resin member which supports the bus bars, the resin member may include an opening, and each bus bar may include a lead pin that is exposed from the opening and connected to the control board.

(3) In the power supply control device according to (2), each bus bar may include a bent portion that is bent outside the resin member and connected to the connection terminal.

(4) In the power supply control device according to (2) or (3), the lead pins may be bent so that tips thereof face the control board.

Effect of the Invention

According to aspects of the present invention, the connection terminals of the bus bar module which is connected to the battery module are exposed when viewed from the control board. Accordingly, after the bus bar module is first bonded to the control board to assemble the power supply control device, the assembled power supply control device can be coupled to the battery module. As a result, it is possible to bond the bus bar module and the control board to each other in a state where the bus bar module is not fixed to the battery module. As a result, according to the present invention, it is possible to improve workability when the power supply control device is installed on the battery module.

DESCRIPTION OF EMBODIMENTS

Hereinafter, a power supply control device according to an embodiment of the present invention will be described with reference to the accompanying drawings. In the following drawings, in order to make members recognizable, scales of the members are appropriately changed.

Figure 1:
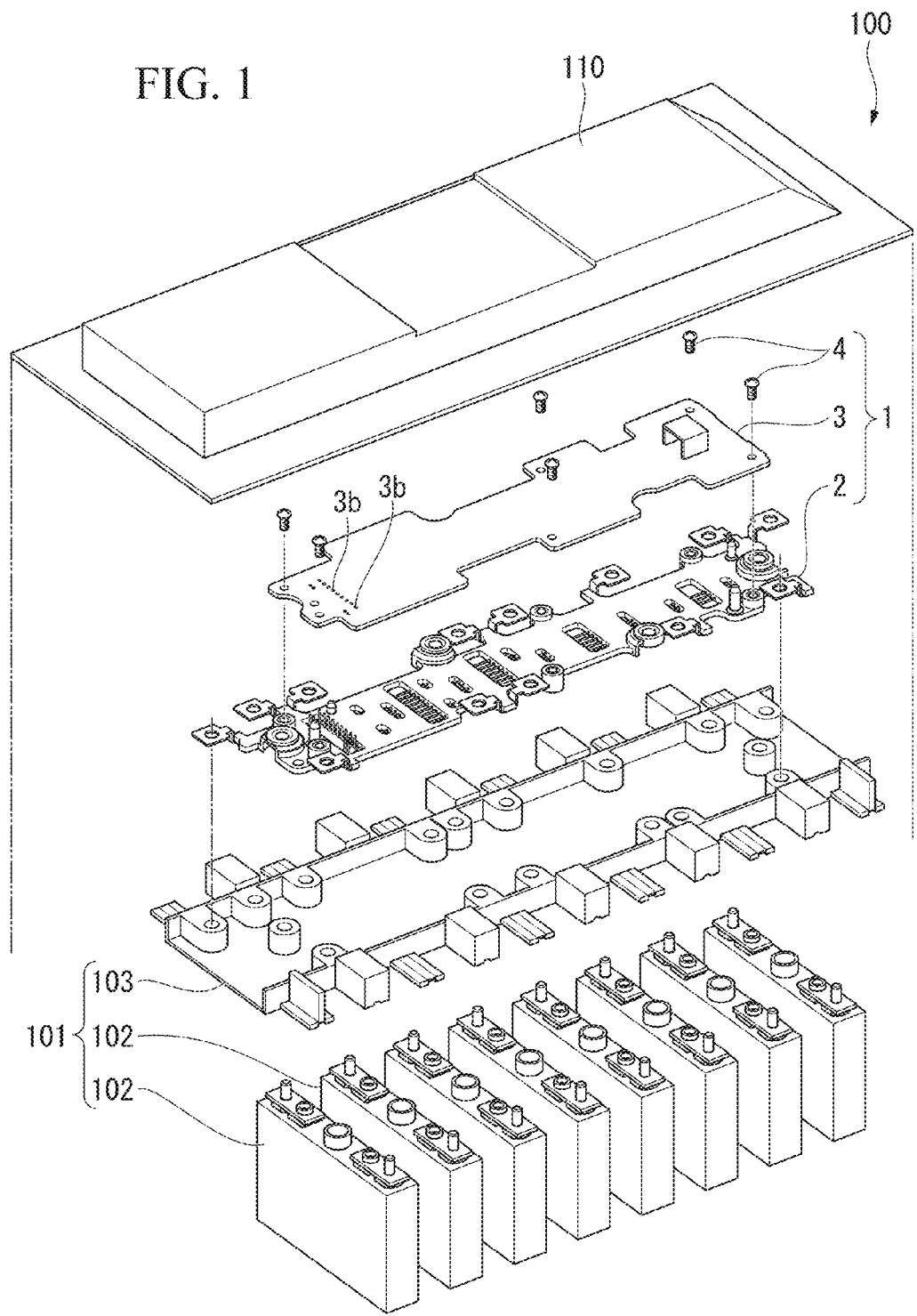
FIG. 1 is an exploded perspective view of a battery system including a power supply control device according to an embodiment of the present invention.

FIG. 1 is an exploded perspective view schematically illustrating a configuration of a battery system 100 including a power supply control device 1 according to this embodiment. As illustrated in the drawing, the battery system 100 includes a battery module 101, a power supply control device 1 according to this embodiment, and a cover 110.

The battery module 101 includes batteries 102, a terminal block 103, and a not-illustrated fixed block. The battery 102 is a storage battery which can be charged and discharged and has terminals disposed on the upper portion thereof The multiple batteries 102 are fixed to the not-illustrated fixed block. The batteries 102 are arranged in the same form. The terminal block 103 is a block for fixing connection terminals of the batteries 102 and includes connection terminals for electrically connecting the batteries 102 to the power supply control device 1. The connection terminals of the terminal block 103 are disposed in a predetermined arrangement pattern on a top surface of the terminal block 103. Since the connection terminals disposed on the top surface of the terminal block 103 serve as connection terminals for electrically connecting the battery module 101 to the power supply control device 1, the connection terminals disposed on the top surface of the terminal block 103 are referred to as connection terminals of the battery module 101 in the following description.

The power supply control device 1 according to this embodiment is disposed on the battery module 101 and includes a bus bar module 2, a control board 3, and screws 4. The bus bar module 2 and the control board 3 are stacked with the bus bar module 2 located on the lower side (the side of the battery module 101) and with the control board 3 located on the upper side (the opposite side to the battery module 101) and are integrated by fastening using the screws 4.

Figure 2A:
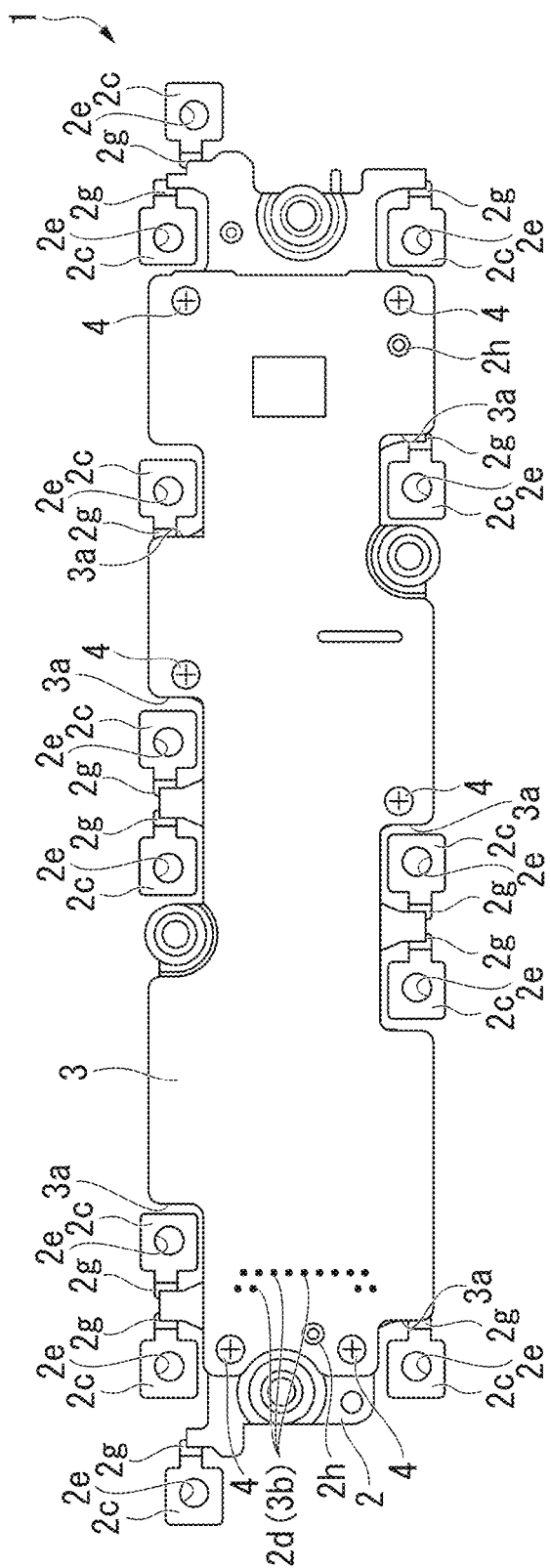
FIG. 2A is a plan view of the power supply control device according to the embodiment of the present invention in which a control board and screws are included.
Figure 2B:
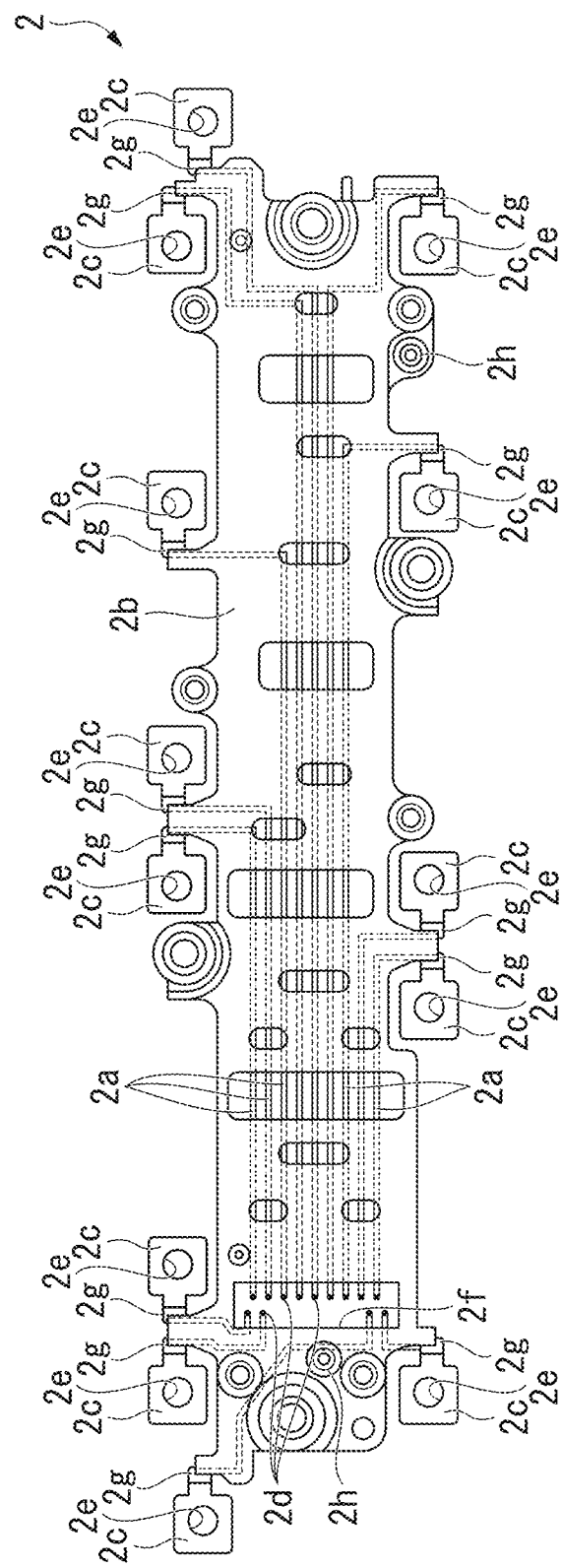
FIG. 2B is a plan view of the power supply control device in which the control board and the screws are omitted.
Figure 3:
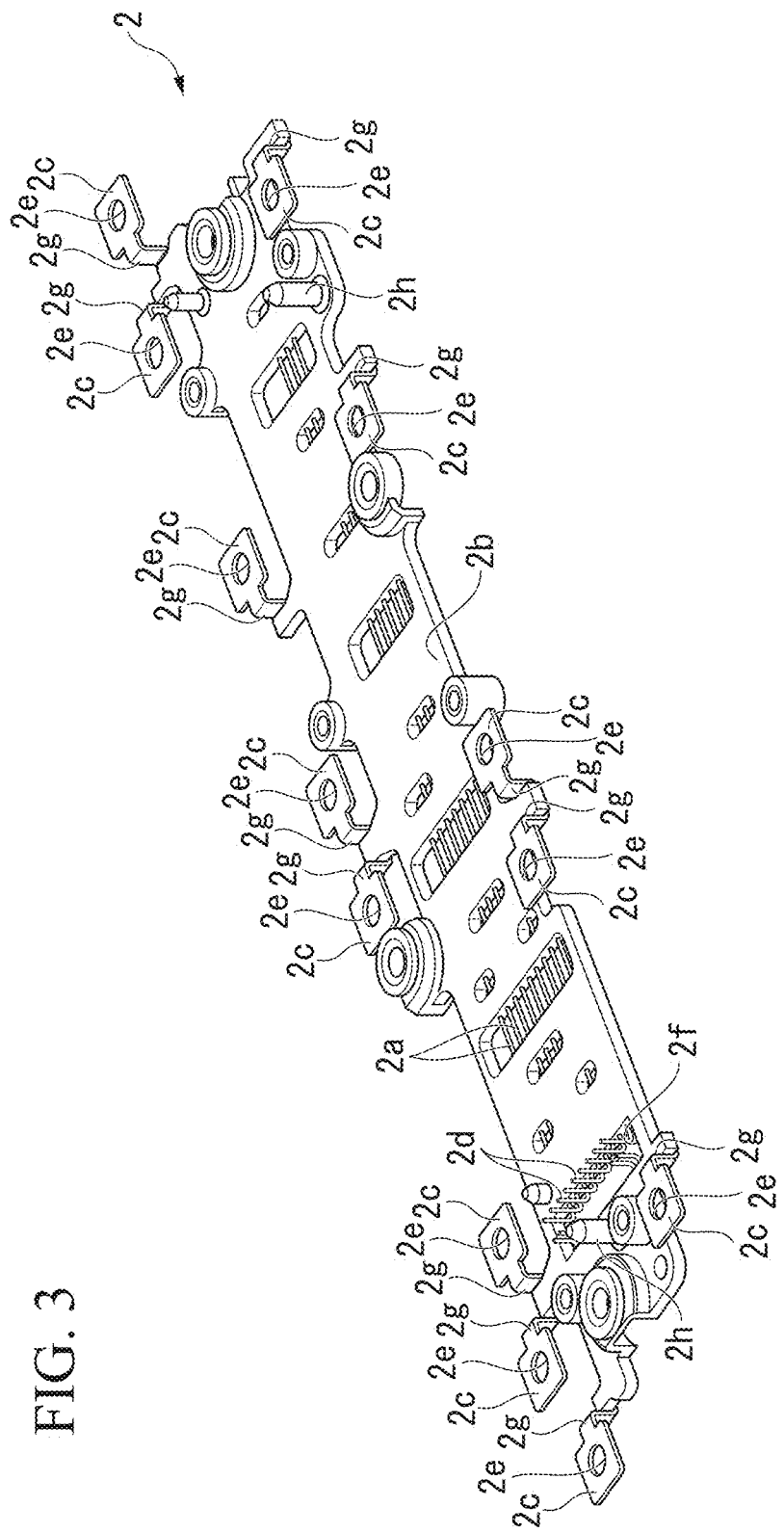
FIG. 3 is a perspective view of the control board of the power supply control device according to the embodiment of the present invention.

Hereinafter, the power supply control device 1 according to this embodiment will be described in more detail with reference to FIGS. 2A, 2B, and 3. FIGS. 2A and 2B are plan views of the power supply control device 1 according to this embodiment. FIG. 2A is a plan view of the power supply control device 1 in which the control board 3 and the screws 4 are included. FIG. 2B is a plan view of the power supply control device 1 in which the control board 3 and the screws 4 are omitted (that is, only the bus bar module 2 is illustrated). FIG. 3 is a perspective view illustrating only the bus bar module.

The bus bar module 2 is a member for electrically connecting the battery module 101 and the control board 3, which are different in arrangement positions or shapes of connection terminals, to each other and includes multiple bus bars 2a and a resin member 2b supporting the bus bars 2a.

Each bus bar 2a is a metal pattern formed of a conductive material such as copper. One end of the bus bar 2a is formed as a substantially square connection terminal 2c and the other end is formed as a lead pin 2d.

The bus bars 2a are provided to correspond to the number of connection terminals of the battery module 101. Each of the bus bars 2a has a connection terminal 2c. The connection terminals 2c of the bus bars 2a are arranged to have the same height as the surroundings of the resin member 2b and are disposed at positions corresponding to the connection terminals of the battery module 101.

Each connection terminal 2c is provided with a through-hole 2e. The bus bar module 2 is fixed to the battery module 101 by screws (not illustrated) inserted into the through-holes 2e, and the connection terminals 2c are electrically connected to the connection terminals of the battery module 101.

The lead pins 2d of the bus bars 2a are gathered in an opening 2f formed on one side (the left side in FIG. 2B) of the resin member 2b, and are arranged to be exposed from the opening 2f. The tip of each lead pin 2d is bent toward the control board 3 (see FIG. 3).

By bonding the lead pins 2d to the connection terminals of the resin member 2b by soldering, the bus bar module 2 is electrically connected to the control board 3.

Each bus bar 2a includes a bent portion 2g which is bent outside the resin member 2b and connected to the corresponding connection terminal 2c. As illustrated in FIG. 3, the bent portion 2g is formed by bending a part of the bus bar 2a so as to rise upward to form a step. The bent portion 2g has a thickness and a width permitting deformation when a load acts on the corresponding connection terminal 2c, and thus has flexibility.

The resin member 2b is a substantially rectangular plate-like member formed of a resin supporting the bus bars 2a. The resin member 2b has the opening 2f for exposing the lead pins 2d at a position overlapping with the control board 3, as illustrated in FIG. 2B. Positioning pins 2h for positioning the control board 3 are formed on the top surface of the resin member 2b.

The bus bar module 2 is formed, for example, by an insert molding which dispose the bus bars 2a in a mold and molds the resin member 2b. For example, polyphenylene sulfide resin (PPS) can be used as the material of the resin member 2b.

The control board 3 is a printed board including a voltage-detecting circuit or the like. The control board 3 is positioned with respect to the bus bar module 2 by fitting the control board to the positioning pins 2h of the bus bar module 2, and is fixed to the bus bar module 2 with the screws 4.

The control board 3 has the same substantially rectangular shape as the resin member 2b of the bus bar module 2, as illustrated in FIG. 2A. The control board 3 includes multiple notches 3a in the peripheral portion thereof so as to expose the connection terminals 2c of the bus bars 2a. In this way, in the power supply control device 1 according to this embodiment, since the control board 3 includes the notches 3a, the connection terminals 2c of the bus bar module 2 which are connected to the battery module 101 are exposed when viewed from the control board 3.

The control board 3 includes through-holes 3b (see FIG. 1) corresponding to the lead pins 2d in areas overlapping with the lead pins 2d of the bus bars 2a. Since the lead pins 2d are inserted into the through-holes 3b and the lead pins 2d are soldered to lands of the control board 3, the bus bar module 2 and the control board 3 are electrically connected to each other.

Referring to FIG. 1 again, the cover 110 is installed on the control board 3 and serves to protect the power supply control device 1. The cover 110 is fixed to the power supply control device 1, for example, with not illustrated screws or the like.

When the battery system 100 having this configuration is assembled, first, the battery module 101 and the power supply control device 1 are individually assembled.

The battery module 101 is assembled by arranging the multiple batteries 102 in the not illustrated fixed block and fixing the terminal block 103 to the batteries.

In the power supply control device 1, the bus bar module 2 and the control board 3 are fixed with the screws 4 and the lead pins 2d are bonded to the control board 3 by a reflow type of soldering.

Subsequently, the power supply control device 1 and the battery module 101 are coupled to each other. Specifically, by inserting not illustrated screws into the through-holes 2e formed in the connection terminals 2c and screwing the screws to the battery module 101, the power supply control device 1 and the battery module 101 are coupled to each other.

Thereafter, the cover 110 is coupled thereto to assemble the battery system 100.

In the power supply control device 1 according to this embodiment having the above-mentioned configuration, the connection terminals 2c of the bus bar module 2 to the battery module 101 are exposed when viewed from the control board 3. Accordingly, after the bus bar module 2 and the control board 3 are first bonded to each other by soldering or the like in order to assemble the power supply control device 1, the assembled power supply control device 1 can be coupled to the battery module 101. Therefore, the bus bar module 2 and the control board 3 can be bonded to each other in a state where the battery module 101 is not fixed to the bus bar module 2. As a result, by employing the power supply control device 1 according to this embodiment, it is possible to improve workability when the power supply control device 1 is installed on the battery module 101.

In the power supply control device 1 according to this embodiment, the bus bar module 2 includes the bus bars 2a each having a connection terminal 2c and the resin member 2b supporting the bus bars 2a. The resin member 2b includes the opening 2f, and each bus bar 2a includes the lead pin 2d exposed from the opening 2f and connected to the control board 3. The opening 2f formed in the resin member 2b is located at a position hidden by the control board 3 when the control board 3 having the substantially same shape is stacked on the resin member.

Accordingly, by forming the through-holes 3b in the control board 3, the lead pins 2d exposed from the opening 2f can be inserted into the through-holes 3b. By inserting the lead pins 2d into the through-holes 3b, it is possible to prevent the lead pins 2d from being separated from the control board 3 even when a certain amount of vibration is applied thereto. Accordingly, by employing the power supply control device 1 according to this embodiment having the above-mentioned configuration, it is possible to reinforce the electrical connection between the bus bar module 2 and the control board 3.

In the power supply control device 1 according to this embodiment, each bus bar 2a has the bent portion 2g which is bent outside the resin member 2b and connected to the corresponding connection terminal 2c. Since the bent portion 2g has flexibility as described above, the bent portion is deformed to absorb an external force when the external force is applied thereto. Accordingly, when a torque applied to the screws is transmitted to the connection terminals 2c at the time of screwing the connection terminals 2c to the battery module 101, it is possible to prevent a local large stress from being generated in the battery system 100 by deforming the bent portions 2g. As a result, when the connection terminals 2c are screwed to the battery module 101, it is possible to prevent the battery module 101 or the power supply control device 1 from being damaged. Even after the power supply control device 1 is assembled, it is possible to absorb external vibration by deforming the bent portions 2g.

In the power supply control device 1 according to this embodiment, the lead pins 2d are bent so that the tips thereof face the control board 3. Accordingly, it is possible to bend the lead pins 2d and thus to cause the lead pins 2d to absorb external vibration.

While the exemplary embodiment of the present invention is described above with reference to the accompanying drawings, the present invention is not limited to the exemplary embodiment. All the shapes or combinations of the elements described in the above-mentioned embodiment are only examples and can be modified in various forms depending on design requirements without departing from the gist of the present invention.

For example, the number or arrangement of connection terminals 2c in the above-mentioned embodiment is only an example, and can be changed depending on the connection terminals of the battery module 101.

In the above-mentioned embodiment, a configuration in which the bent portions 2g are bent in the vertical direction is employed.

However, a part of each bus bar may be bent in the horizontal direction and the bent part may be used as the bent portion. A part of each bus bar may be bent in the horizontal direction and the vertical direction and the bent part may be used as the bent portion.

REFERENCE SIGNS LIST

1: power supply control device
2: bus bar module
2a: bus bar
2b: resin member
2c: connection terminal
2d: lead pin
2e: through-hole
2f: opening
2g: bent portion
2h: positioning pin
3: control board
3a: notch
3b: through-hole
4: screw
100: battery system
101: battery module
102: battery
103: terminal block

The invention claimed is:
1. A power supply control device, comprising:
a control board that is configured to control a voltage of a battery module; and
a bus bar module that is configured to electrically connect the control board and the battery module,
wherein a recessed part is provided at an edge part of the control board,
wherein the control board and the bus bar module are arranged in a stacked manner, and
wherein connection terminals of the bus bar module which are connected to the battery module are exposed through the recessed part when viewed from the control board,
wherein the bus bar module includes bus bar, which have the connection terminals, and a resin member which supports the bus bars,
wherein the resin member includes an opening, and
wherein each bus bar includes a lead pin that is exposed from the opening and connected to the control board.

2. The power supply control device according to claim 1, wherein the lead pins are bent so that tips thereof face the control board.

3. The power supply control device according to claim 1, wherein each bus bar includes a bent portion that is bent outside the resin member and connected to the connection terminal.

\* \* \* \* \*